United States Patent [19]

Terry

[11] 3,917,128

[45] Nov. 4, 1975

[54] WIND OPERATED ADJUSTABLE BIRD FEED DISPENSER

[76] Inventor: Floyd Luke Terry, P.O. Box 6602, Shreveport, La. 71106

[22] Filed: Dec. 5, 1973

[21] Appl. No.: 421,862

Related U.S. Application Data

[63] Continuation of Ser. No. 184,824, Sept. 29, 1971, abandoned.

[52] U.S. Cl. .............................................. 222/410
[51] Int. Cl. ........................................... G01f 11/24
[58] Field of Search .......................... 222/410–413, 222/180, 181, 248, 360, 322, 333, 440, 411; 221/277, 258, 565; 416/175, 197; 415/89

[56] References Cited
UNITED STATES PATENTS

| 89,072 | 4/1869 | Putnam | 222/410 X |
| 439,495 | 10/1890 | Everett | 222/410 X |

*Primary Examiner*—Stanley H. Tollberg
*Assistant Examiner*—Norman L. Stack, Jr.
*Attorney, Agent, or Firm*—Burns, Doane, Swecker & Mathis

[57] ABSTRACT

A method and apparatus for self-dispensing feed onto a ground surface from a suspended dispensing container in generally circular fall patterns of varying diameter.

The apparatus includes an orifice plate positioned upon the bottom of a feed container. The opening of the orifice is provided with a truncated cone restriction which may be rotated by a wind motor to maintain flow through the orifice opening and dispense the feed in a fall pattern of varying diameter. To increase the fall pattern diameter, troughs may be connected to the wind motor to catch the feed after it passes through the orifice, transport the feed away from a central axis of the container and centrifugally scatter the feed in wide fall patterns of randomly variable diameters.

13 Claims, 7 Drawing Figures

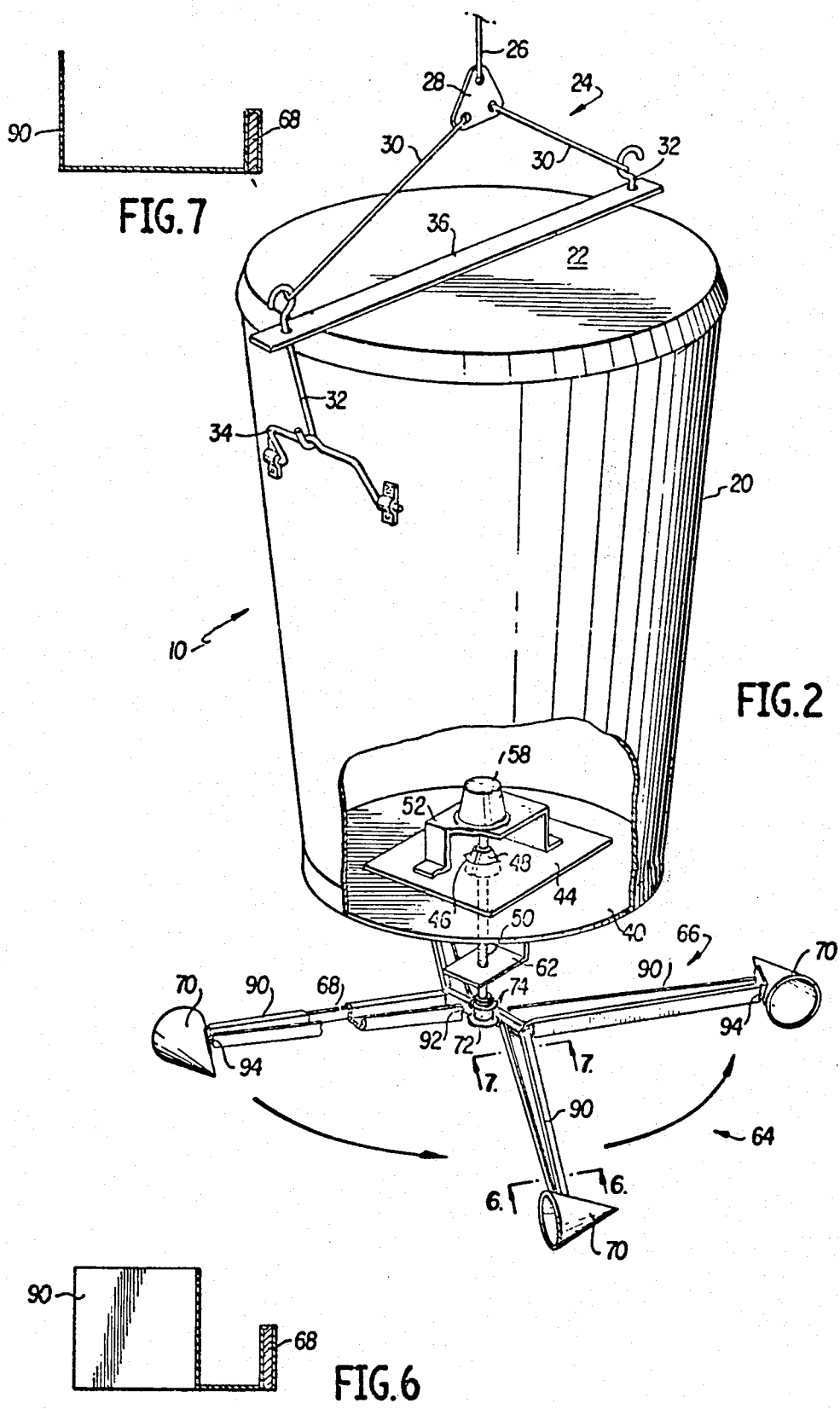

WIND OPERATED ADJUSTABLE BIRD FEED DISPENSER

This is a continuation, of application Ser. No. 184,824, filed Sept. 29, 1972 now abandoned.

BACKGROUND OF THE INVENTION

This invention relates to a method and apparatus for self-dispensing feed. More particularly, the invention relates to a method and apparatus for self-dispensing bird feed such as, for example, grain and the like.

Frequently, it is desirable to supplement the natural sources of food of wildlife such as wild fowl particularly during winter months or during other periods when the natural food sources of fowl become scarce. Further, it is often desirable to attract flowl to a particular location by the technique of regular or systematic feeding in the desired area.

At least one previously known technique for supplementing the food source of wild fowl comprises manually distributing grain upon the ground at a desired location. This technique, however, has the drawback that an attendant must be present at each feeding to distribute the grain.

Previously known feeders which simultaneously provide a storage container and gravity discharge are not known to also provide a means for promoting flow from the container or dispensing the feed upon a ground surface in fall patterns of varying diameter.

Therefore, it would be highly desirable to provide a method and apparatus of supplementing natural wildlife food sources which would be self-dispensing, would provide a significant storage capability so that servicing may be minimized, yet reliably dispense the feed upon a ground surface in a generally circular pattern of randomly variable diameter so as to minimize buildup in one location.

OBJECTS AND SUMMARY OF THE INVENTION

Objects of the Invention

It is therefore a general object of the invention to provide a method and apparatus for storing a desired quantity of feed and self-dispensing the feed upon a ground surface or the like.

It is another object of the invention to provide a method and apparatus for self-dispensing feed which will minimize the tendency of the feed to clog at the orifice opening and thus maintain gravity flow of feed through the orifice.

It is yet another object of the invention to provide a method and apparatus for breaking clots of feed grains or oversized grains before the dispensing thereof.

It is still another object of the invention to provide a method and apparatus for dispensing grain of various sizes.

It is a further object of the invention to provide a method and apparatus for randomly varying the fall pattern of the feed upon a ground surface to thus minimize buildup in any particular location.

Brief Summary

A preferred embodiment of the invention intended to accomplish at least some of the foregoing objects comprises a container having side walls, a cover and a bottom. The bottom is provided with an orifice disposed therein with a restrictor positioned within the opening of the orifice for restricting gravity flow of feed therethrough. A motor is connected to the restrictor for rotating the restrictor within the orifice opening to promote continuous gravity flow of feed through the opening and simultaneously scatter the feed in generally circular fall patterns away from the container.

A significant method aspect of the invention comprises suspending a desired amount of feed above a ground surface within a container having an orifice fashioned in the bottom thereof thus permitting the feed to flow from the container by gravity. Additionally, the method contemplates restricting the gravity flow of feed from the container by placing a restrictor within the orifice. The feed is dispensed peripherally away from the container by rotating the restrictor within the orifice to provide a generally circular fall pattern of feed away from and about the container.

THE DRAWINGS

Further objects and advantages of the invention will become apparent from the following detailed description taken in conjunction with the accompanying drawings, wherein:

FIG. 2 is a detailed perspective view of a preferred embodiment of the invention with a lower segment of the container cut away to disclose an orifice plate with a truncated conical restrictor positioned therein;

Figure 3:
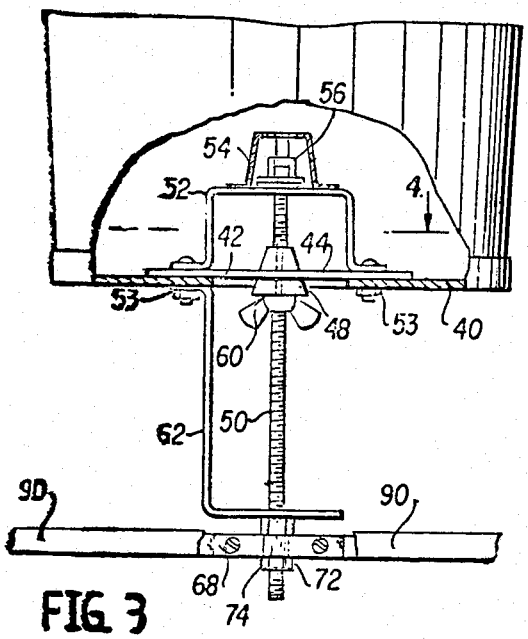
Figure 4:
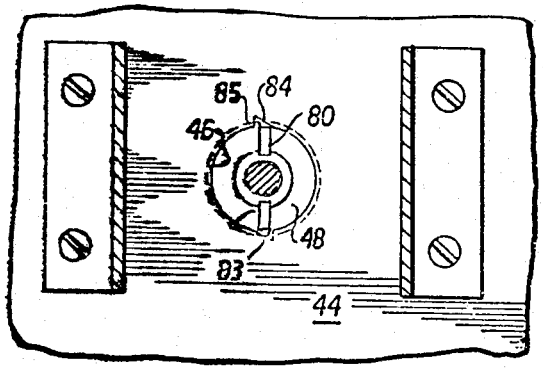
Figure 5:
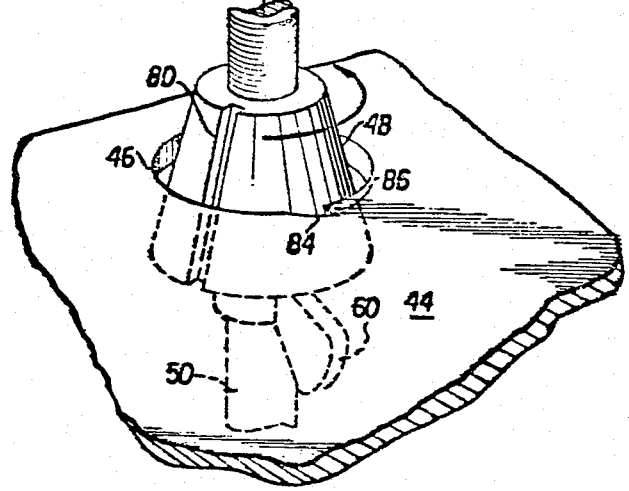

FIG. 3 discloses a partial side elevational view of the feed container with a lower segment thereof broken away to disclose in detail the orifice plate and truncated cone restrictor arrangement;

FIG. 4 is a cross-sectional view taken along section line 4—4 of FIG. 3 disclosing a top view of the orifice plate and truncated restrictor arrangement;

FIG. 5 is a perspective view disclosing the space relationship and rotational motion of the restrictor with respect to the opening in the orifice plate;

FIG. 6 is a sectional view taken along section line 6—6 of FIG. 2; and

FIG. 7 is a sectional view taken along section line 7—7 of FIG. 2.

DETAILED DESCRIPTION

Figure 1:
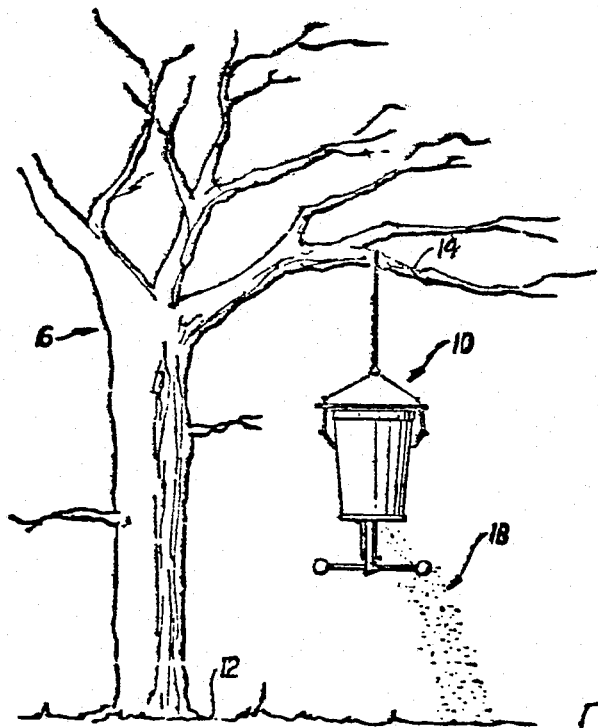
FIG. 1 is a schematic view of a preferred embodiment of the invention disclosing a self-dispensing feed container suspended from a tree limb and automatically dispensing grain in a circular fall pattern peripherally away from the container.

Referring now to the drawings wherein like numerals designate like parts, and more specifically to FIG. 1, there will be seen a self-dispensing feeder 10 hanging above a ground surface 12 from a suitable branch 14 of a tree 16. This positioning of the self-dispensing feeder from a tree branch is typical of the environment envisioned for the subject invention although it will be realized that in those instances where suitable trees are not available a standard (not shown) may be substituted therefor to suspend the self-dispensing feeder above a ground surface. The feeder as shown in FIG. 1 is dispensing grain 18 in circular fall patterns of varying diameter in a manner which will be discussed in more detail hereinafter.

Referring now to FIG. 2, the grain self-dispensing feeder 10 is disclosed in more detail and includes a container 20. The container 20 is dimensioned to store a sufficient quantity of feed to minimize the necessity of high frequency servicing. The container is provided with a lid or cover 22 which serves to protect the contents of the container 20 from the elements while providing a ready access port to refill the container with feed during servicing of the unit.

The feed container 20 shown suspended in FIG. 1 hangs by an arrangement of interconnected rods 24. First a generally vertical member 26 is provided suitable for attachment to a tree limb or the like. At the base of the vertical member 26 is a bifurcation bracket 28 which serves to connect the vertical member 26 with a pair of sloping arms 30. The arms 30 in turn connect to members 32 which have suitable end hooks for ready attachment to handles 34 affixed to the exterior surface of the container 20. The upper ends of the support members 32 are maintained in a spaced relationship by a spreading bar 36 so that members 32 do not bear against and deform the container 20 and the lid 22. The support arrangement 24 is disclosed as being illustrative and other suitable support arrangements may be conveniently utilized without departing from the scope of the invention. More specifically, in those instances as previously mentioned where an overhanging tree limb is not available, the container 20 may be suspended from a generally vertical post having a cantilever arm with a loop connected to the end thereof which may encompassingly surround the outer surface of the container and support it above a ground surface.

Referring now specifically to the lower portion of FIG. 2, there will be seen a bottom 40 extending across the base end of the container to retain feed within the container. The bottom 40 as more clearly seen in FIG. 3 is fashioned with an aperture 43 therein and the aperture is covered with an orifice plate 44. The orifice plate 44 is provided with a central opening or orifice 46. An axially adjustable truncated conical restriction member 48 is positioned within the orifice 46 to regulate the gravity flow of grain through the orifice in a manner more fully discussed hereinafter.

The restrictor 48 is threadedly received upon a central shaft 50. The shaft is supported at its upper end by a U-shaped bridge 52 which is centrally disposed above the orifice 46 and fixedly connected to the orifice plate 44 and the bottom of the container 40 by conventional fastening means such as, for example, nut and bolt combinations 53. The shaft 50 extends through an aperture in the center of bridge 52 and further through a thrust bearing 54 which is preferably of the roller bearing type. Threadedly received upon the upper end of the shaft 50 are a pair of nuts 56 which act in combination to fixedly provide a support stop for the shaft 50. Other means of providing a stop may be utilized such as, for example, a cotter pin arrangement or an integral head formed at the top of the shaft 50. An inverted cup 58 is placed over the bearing 54 to shield the moving parts thereof from engagement with material within container 20.

Restrictor 48 is axially adjustable by rotating the restrictor upon threaded shaft 50. The desired axial location of the restrictor 48 may be maintained by turning into abutting relationship with the base portion thereof a wing nut 60, as shown in FIG. 3.

Referring now particularly to FIGS. 4 and 5, there will be seen in detail the orifice 46 and the relationship therewith of the axially adjustable truncated conical restrictor 48. The restrictor 48 is provided with a generally U-shaped groove 80 which extends along the slant height thereof. A second groove 82 is shown in FIG. 4 disposed at a diametrically remote posture from the groove 80 and is similar in character. In some instances, it may be desired to form further grooves in the restrictor 48 and in such case it will be appreciated that they should be approximately symmetrically disposed about a central axis 81 of the conical restrictor 48.

The orifice 46 is fashioned with a recessed tooth 84 having a sharp bite edge 86. In some instances, it may be desirable to form more than one recessed tooth and in such case, as shown in FIG. 4, a second tooth 88 is positioned diametrically remote from the first tooth 84. Other recessed teeth may be provided in the orifice 84 as desired and in those instances where additional teeth are provided it is intended that they be spaced symmetrically about the orifice 46.

Returning now to FIG. 2 the shaft 50 is stabilized at its lower end by a downwardly depending L-brace 62 and has connected to the lower end thereof a wind motor 64. The wind motor 64 includes a hub 72 and a plurality of vanes 66 comprising radially extending spokes 68 having unidirectional acting cup-shaped tip portions 70 attached to the outer extreminites thereof. The hub 72 is held between a pair of bearing members 74 which may simply be washer-nut combinations, or if desired, roller thrust bearings.

The spokes 68 which carry tip portions 70 may also in some instances serve to support dispensing and scattering troughs 90. These troughs are generally U-shaped in cross-section, note FIGS. 6 and 7, and may be tapered from the inner end 92 adjacent the hub 74 to the outer end 94 adjacent the cups 70. The troughs are removably attached to spokes 68 by a lip 96 suitable to snuggly engage the spoke.

In operation an attendant would remove the cover 22 from the self-dispensing feed container 20 and fill the container with a desired feed such as, for example, grain. The cover would be replaced and the attendant would leave the feeder to self-dispense the grain upon the ground surface 12.

This self-dispensing operation is provided by permitting the grain to flow by gravity through the opening of orifice 46 and fall onto the ground surface 12. The amount of gravity flow may be preset by adjusting the axial position of the truncated cone restrictor 48 and locking it in place by setting wing nut 60. The grain 18 is then dispensed in a circular fall pattern around the bottom of the feeder 10.

Often, when grain is retained for any length of time within a container, moisture buildup will tend to prevent the grain from freely flowing. In such case the wind motor proves particularly advantageous. In this connection, as wind engages the unidirectional cups 70 of the wind motor 64, the shaft 50 is rotated which in turn rotates the restrictor 48 which tends to loosen the clogged grain and promote flow between the surface of the restrictor 48 and the inner periphery of the orifice 46. Furthermore, the slant height grooves 80 fashioned into the surface of the restrictor 48 tend to engage the grain and promote the flow past the restrictor.

In some instances an oversized grain or a grain cluster may be found in the container. As this oversized grain descends to the orifice to be dispensed, the groove or slot 80 will tend to carry the grain around the inner periphery of the orifice 46 until a recessed tooth 84 fashioned within the orifice periphery is encountered. Upon such occurrence, the sharp bite edge 86 of the tooth will fracture the grain or grain cluster and permit it to be dispensed with the other smaller grain sizes. In this connection, as previously noted, the wind cups 70 are unidirectional and act as illustrated in the drawing to rotate the wind vane in a counterclockwise direction. This rotation in turns rotates the restrictor 48 counterclockwise or into the sharp bite edge 86 of a recessed tooth 84. In the event that a single encounter of the sharp bite edge 86 with the oversized grain does not fracture the grain, the reaction force created will tend to counter rotate the shaft in a clockwise direction momentarily and thereafter the wind motor will again rotate the grain into the sharp bite edge of the recessed tooth. The procedure will be repeated in a back and forth bouncing mode until the grain is fractured thus enabling it to pass from the container and be dispensed with the smaller grain sizes.

In addition to the above described functions of restricting and simultaneously promoting grain flow the restrictor-wind motor combination further tends to flip the grain 18 by centrifugal force away from a single uniform fall pattern directly beneath the base 40 of the container. More particularly, as the wind varies in a random manner the rotation of the wind motor 64 will have a corresponding random speed and thus the circular fall pattern of grain 18 will tend to have a varying diameter which will thus minimize the tendency of grain 18 to build up in a single circular fall pattern.

In some instances it may be desirable to increase the distribution area. In such case troughs 90 are attached to spokes 68 as previously mentioned. These troughs have wide mouths at the inner end 92 to catch the grain as it falls from the orifice. The grain is then generally horizontally transported by centrifugal force away from the central axis 81 of the restrictor. The troughs 90 may be tapered at the outer ends thereof 94 to restrict the grain flow area and increase the grain's horizontal speed to scatter the grain in wide fall patterns of randomly variable diameters.

It will be appreciated that some grain will fall between adjacent spokes in a circular fall pattern beneath the container and some other grain will be caught by the troughs, transported outwardly and scattered further away from the container. The grains that fall between the rotating troughs may be grazed thereby thus further scattering the grains and promoting a random fall pattern. Additionally, wind currents created by the rotating troughs tends to promote grain scattering and uniform fall patterns.

SUMMARY OF THE MAJOR ADVANTAGES

It will be appreciated by those skilled in the art that the above described invention discloses a method and apparatus for the self-dispensing of feed which permits infrequent servicing and may be adjusted to handle a variety of grain sizes.

The self-dispensing feeder is provided with an orifice and truncated cone restrictor which may be precision manufactured to promote a uniform flow. Further, the rotational motion of the restrictor within the orifice minimizes the tendency of clogs forming at the orifice due to caking of the grain. Moreover, the truncated cone is provided with slots to further minimize any caking tendency and additionally coact with recessed teeth in the periphery of the orifice to break up and fracture grain clusters or over-sized grain.

The wind motor is generally continuous in operation as long as the wind is blowing and is further randomly variable which tends to promote a variable circular fall pattern of grain upon a ground surface away from the base of the container. Further troughs may be effectively utilized to increase the diameters of the grain fall patterns.

Additionally, the wind motor, troughs, orifice plate and truncated cone restrictor may be connected on location to a feed container to provide the container with at least some of the above noted advantageous self-dispensing properties.

Although the invention is described with reference to a preferred embodiment it will be appreciated by those skilled in the art that additions, deletions, modifications, substitutions and other changes not specifically described and illustrated in this embodiment may be made which will fall within the purview of the claimed invention.

What is claimed is:

1. A self-dispensing feeder comprising:

a container having side walls and a bottom, said bottom having an orifice disposed therein for permitting feed positioned within the interior of said container to fall out of said container by gravity;

an axially adjustable conical member connected to said container and coaxially disposed within said orifice for restricting the opening of said orifice, said conical member having an upper portion thereof extending above the plane of the orifice and a bottom portion thereof extending beneath the plane of the orifice, said conical member having at least one surface slot therein extending along the slant height thereof;

motor means connected to said conical member for rotating said conical member within said orifice to facilitate the flow of feed between the exterior surface of the conical member and the interior periphery of said orifice; and said orifice being fashioned with at least one recessed tooth in the peripheral edge thereof, said at least one tooth being provided with a sharp bite edge for engaging grains of feed carried by said at least one surface slot for fracturing oversized grains to permit the grain to pass between the outer periphery of said conical member and the inner periphery of said orifice.

2. A self-dispensing feeder as defined in claim 1 wherein said motor means comprises:

a wind motor.

3. A self-dispensing feeder as defined in claim 2 wherein said wind motor comprises:

a plurality of spokes radiating from a hub operatively connected to said conical member and having unidirectional cup-shaped tip portions, one cup being affixed to the end of each spoke and oriented to rotate the said conical member into the sharp bite edge of said at least one recessed tooth.

4. A self-dispensing feeder comprising:

a container having side walls and a bottom, said bottom having an orifice disposed therein for permitting feed positioned within the interior of said container to fall out of said container by gravity;

an axially adjustable conical member connected to said container and coaxially disposed within said orifice for restricting the opening of said orifice, said conical member having an upper portion thereof extending above the plane of the orifice and a bottom portion thereof extending beneath the plane of the orifice, said conical member having at least one surface slot extending along the slant height thereof; a wind motor connected to said conical member for rotating said conical member within said orifice to facilitate the flow of feed between the exterior surface of said conical member and the interior periphery of said orifice, said wind motor including a plurality of spokes radiating from a hub operatively connected to said conical member and having unidirectional cup-shaped tip portions, one cup being affixed to the end of each spoke and oriented to rotate the said conical member into the sharp bite edge of said at least one recessed tooth;

means for suspending said container above a ground surface;

said orifice being fashioned with at least one recessed tooth in the peripheral edge thereof, said at least one tooth being provided with a sharp bite edge for engaging grains of feed carried by said at least one surface slot and for fracturing oversized grain to permit the grain to pass between the outer periphery of said conical member and the inner periphery of said orifice; and trough means connected to said spokes for catching at least some of the feed dispensed from said container and carrying the feed away from the hub to increase the diameter of the fall pattern of said self-dispensing feeder.

5. A self-dispensing feeder as defined in claim 4 wherein said trough means has:

a diminishing cross-section from an inner end thereof positioned adjacent to said hub to facilitate the collection of feed falling from the container to an outer end thereof ending adjacent said tip portions to scatter the feed in fall patterns of wide diameters.

6. A self-dispensing device for a feeder comprising:

an orifice plate having an orifice therethrough suitable for placement over an aperture in the bottom of a feed container;

an axially adjustable conical member connected to said orifice plate and disposed within said orifice for restricting the opening of said orifice, said conical member having an upper portion thereof extending above the plane of the orifice and a bottom portion thereof extending beneath the plane of the orifice, said conical member having at least one surface slot therein extending along the slant height thereof;

motor means connected to said conical member for rotating said member within said orifice; and said orifice being fashioned with at least one recessed tooth in the peripheral edge thereof, said at least one tooth being provided with a sharp bite edge for engaging grains of feed carried by said at least one surface slot and for fracturing oversized grain to permit the grain to pass between the outer periphery of said conical member and the inner periphery of said orifice.

7. A self-dispensing device as defined in claim 6 wherein said wind motor comprises:

a plurality of spokes radiating from a hub operatively connected to said conical member and having unidirectional cup-shaped tip portions, one cup being affixed to the end of each spoke and oriented to rotate said conical member into the sharp bite edge of said at least one recessed tooth.

8. A self-dispensing device as defined in claim 6 wherein said motor means comprises:
a wind motor.

9. A self-dispensing feeder as described in claim 8 and wherein:

said trough means includes a diminishing cross section from an inner end thereof positioned adjacent to said hub to facilitate the collection of feed falling from the container to an outer end thereof ending adjacent said tip portions to scatter the feed in fall patterns of wide diameters.

10. A self-dispensing device for a feeder comprising:

an orifice plate having an orifice therethrough suitable for a placement over an aperture in the bottom of a feed container;

an axially adjustable conical member connected to said orifice plate and coaxially disposed within said orifice for restricting the opening of said orifice, said conical member including at least one surface slot therein extending the slant height thereof; said orifice being fashioned with at least one recessed tooth in the peripheral edge thereof, said at least one tooth being provided with a sharp bite edge for engaging grains of feed carried by said at least one surface slot and for fracturing oversized grain to permit the grain to pass between the outer periphery of said conical member and the inner periphery of said orifice;

a wind motor connected to said conical member for rotating said member within said orifice, said wind motor including a plurality of spokes radiating from a hub operatively connected to said conical member and having unidirectional cup-shaped tip portions, one cup being affixed to the end of each spoke and oriented to rotate the said conical member into the sharp bite edge of said at least one recessed tooth; and trough means connected to said spokes for catching at least some of the feed dispensed from said container and carrying the feed away for the hub to increase the diameter of the fall pattern of said self-dispensing feeder.

11. A self-dispensing feeder as defined in claim 10 wherein said trough means has:

a diminishing cross section from an inner end thereof positioned adjacent to said hub to facilitate the collection of feed falling from the container to an outer end thereof ending adjacent said tip portions to scatter the feed in fall patterns of wide diameters.

12. A method for automatically dispensing feed comprising the steps of:

suspending feed above a ground surface within a container having an orifice fashioned in the bottom thereof thus permitting feed to flow from the container by gravity;

restricting gravity flow of feed from the container by placing an axially adjustable conical member coaxially within the orifice, said conical member having an upper portion thereof extending above the plane of the orifice and a bottom portion thereof extending beneath the plane of the orifice;

comminuting the oversized particles of grain between at least one recessed tooth having a sharp bite edge provided on the inner periphery of the orifice and a slot provided on the slant height of the conical member; dispensing feed peripherally away from the container by rotating the conical member within the orifice by the utilization of a wind motor;

catching at least a portion of the feed which flows from the container;

centrifugally transporting in a generally horizontal plane the feed thus caught; and scattering the feed caught away from the base of the container in a generally circular fall pattern.

13. A self-dispensing feeder comprising:

a container having side walls and a bottom, said bottom having an orifice disposed therein for permitting feed positioned within the interior of said container to fall out of said container by gravity;

an axially adjustable conical member connected to said container and coaxially disposed within said orifice for restricting the opening of said orifice;

a wind motor connected to said conical member for rotating said conical member within said orifice to facilitate the flow of feed between the exterior surface of the conical member and the interior periphery of said orifice;

a plurality of spokes radiating from a hub operatively connected to said conical member and having unidirectional cup-shaped tip portions, one cup being affixed to the end of each spoke and oriented to rotate said conical member;

trough means connected to said spokes for catching at least some of the feed dispensed from the container and carrying the feed away from the hub to increase the diameter of the fall pattern of said self-dispensing feeder.

* * * * *